United States Patent
Inaba

(10) Patent No.: US 11,839,819 B2
(45) Date of Patent: Dec. 12, 2023

(54) RECORDING MEDIUM AND GAME CONTROL METHOD

(71) Applicant: AGNI-FLARE CO., LTD., Yokohama (JP)

(72) Inventor: Takeshi Inaba, Yokohama (JP)

(73) Assignee: AGNI-FLARE CO., LTD., Yokohama (JP)

( * ) Notice: Subject to any disclaimer, the term of this patent is extended or adjusted under 35 U.S.C. 154(b) by 0 days.

(21) Appl. No.: 17/813,916

(22) Filed: Jul. 20, 2022

(65) Prior Publication Data

US 2022/0355203 A1 Nov. 10, 2022

Related U.S. Application Data

(63) Continuation of application No. 17/191,616, filed on Mar. 3, 2021, now Pat. No. 11,413,534, which is a
(Continued)

(30) Foreign Application Priority Data

Sep. 6, 2018 (JP) .................. 2018-167186

(51) Int. Cl.
*A63F 13/57* (2014.01)
*A63F 13/95* (2014.01)
*A63F 9/06* (2006.01)

(52) U.S. Cl.
CPC ............ *A63F 13/57* (2014.09); *A63F 9/0612* (2013.01); *A63F 13/95* (2014.09)

(58) Field of Classification Search
CPC ....... A63F 13/57; A63F 13/95; A63F 13/0612
See application file for complete search history.

(56) References Cited

U.S. PATENT DOCUMENTS 5,265,888 A * 11/1993 Yamamoto .............. A63F 13/80
  463/10
5,301,953 A * 4/1994 Levin .................... A63F 3/0457
  273/276

(Continued)

FOREIGN PATENT DOCUMENTS

JP   H08276069 A   10/1996
JP   2004016267 A   1/2004
(Continued)

OTHER PUBLICATIONS

Office Action received for Taiwanese Patent Application No. 108132286, dated Feb. 10, 2023, 9 pages.
(Continued)

*Primary Examiner* — David L Lewis
*Assistant Examiner* — Matthew D Hoel
(74) *Attorney, Agent, or Firm* — Kubota & Basol LLP

(57) ABSTRACT

A game control method realizes an electronic game that proceeds as a result of objects being arranged in a game field. The method comprises: arranging an object; determining whether or not a group of unit elements arranged adjacent to each other in the game field forms a predetermined shape; managing a region including the group of unit elements that forms the predetermined shape as an erasure-determined region; erasing, from the game field, the group of unit elements included in the erasure-determined region, of groups of unit elements arranged in the game field, if the erasure-determined region satisfies a predetermined condition, and leaving unit elements not included in the erasure-determined region; and performing control such that a new arrangement object can be arranged in squares from which the group of unit elements have been erased.

7 Claims, 11 Drawing Sheets

Related U.S. Application Data continuation-in-part of application No. PCT/JP2019/035145, filed on Sep. 6, 2019.

(56) References Cited

U.S. PATENT DOCUMENTS

| | | | | |
|---|---|---|---|---|
| 5,393,062 A * | 2/1995 | Cember | A63F 3/0421 | 434/167 |
| RE36,675 E * | 4/2000 | Yamamoto | A63F 13/48 | 463/10 |
| 6,244,959 B1 * | 6/2001 | Miyamoto | A63F 13/822 | 463/31 |
| 6,256,047 B1 * | 7/2001 | Isobe | G06T 17/00 | 463/2 |
| 6,375,572 B1 * | 4/2002 | Masuyama | A63F 13/92 | 463/31 |
| 6,398,641 B1 * | 6/2002 | Yamagami | A63F 9/10 | 463/9 |
| 6,458,032 B1 * | 10/2002 | Yamagami | A63F 9/0612 | 463/9 |
| 6,540,611 B1 * | 4/2003 | Nagata | A63F 13/833 | 463/31 |
| 6,641,482 B2 * | 11/2003 | Masuyama | A63F 13/22 | 463/43 |
| 7,094,147 B2 * | 8/2006 | Nakata | A63F 13/52 | 463/31 |
| 7,425,175 B2 * | 9/2008 | Nakano | A63F 13/80 | 463/9 |
| 7,637,813 B2 * | 12/2009 | Katayama | A63F 13/573 | 463/31 |
| 7,648,415 B2 * | 1/2010 | Izuno | A63F 13/92 | 463/31 |
| 7,686,693 B2 * | 3/2010 | Danieli | A63F 13/215 | 709/204 |
| 7,695,406 B2 * | 4/2010 | Waters | A63F 13/22 | 482/8 |
| 7,717,781 B2 * | 5/2010 | Hattori | A63F 13/537 | 463/31 |
| 7,775,866 B2 * | 8/2010 | Mizuguchi | A63F 13/80 | 463/9 |
| 7,819,739 B2 * | 10/2010 | Irwin, Jr. | A63F 3/0665 | 273/237 |
| 7,867,075 B2 * | 1/2011 | Irwin, Jr. | G07F 17/3218 | 463/19 |
| 7,878,891 B2 * | 2/2011 | Chiu | G06V 10/50 | 463/9 |
| 7,959,503 B2 * | 6/2011 | Streeter | A63F 3/0645 | 235/487 |
| 8,033,905 B2 * | 10/2011 | Irwin, Jr. | A63F 3/0645 | 273/269 |
| 8,066,571 B2 * | 11/2011 | Koster | A63F 13/79 | 463/43 |
| 8,096,879 B2 * | 1/2012 | Takeda | A63F 13/80 | 463/31 |
| 8,105,143 B2 * | 1/2012 | Hagiwara | A63F 13/426 | 463/9 |
| 8,128,476 B1 * | 3/2012 | Sidhu | A63F 7/0058 | 463/16 |
| 8,128,501 B2 * | 3/2012 | Theimer | A63F 13/35 | 463/42 |
| 8,160,994 B2 * | 4/2012 | Ong | A63F 13/10 | 706/62 |
| 8,167,692 B2 * | 5/2012 | Katayama | A63F 13/92 | 463/1 |
| 8,167,721 B2 * | 5/2012 | Fujisawa | A63F 13/98 | 463/36 |
| 8,313,370 B2 * | 11/2012 | Rogers | A63F 13/67 | 463/7 |
| 8,317,582 B2 * | 11/2012 | Nagaoka | A63F 13/80 | 463/9 |
| 8,357,045 B2 * | 1/2013 | Youm | A63F 13/45 | 463/4 |
| 8,366,527 B2 * | 2/2013 | Takeda | A63F 13/80 | 463/31 |
| 8,398,476 B1 * | 3/2013 | Sidhu | A63F 13/812 | 463/31 |
| 8,430,755 B2 * | 4/2013 | Youm | A63F 13/795 | 463/43 |
| 8,444,490 B2 * | 5/2013 | Youm | A63F 13/795 | 463/4 |
| 8,444,492 B2 * | 5/2013 | Youm | A63F 13/48 | 463/42 |
| 8,475,279 B2 * | 7/2013 | Danieli | A63F 13/87 | 463/31 |
| 8,480,464 B2 * | 7/2013 | Fujimoto | A63F 9/0612 | 463/9 |
| 8,496,531 B2 * | 7/2013 | Youm | A63F 13/77 | 700/91 |
| 8,517,834 B2 * | 8/2013 | Krzeslo | A63F 13/45 | 463/9 |
| 8,556,713 B2 * | 10/2013 | Pilip | A63F 13/63 | 463/29 |
| 8,585,505 B2 * | 11/2013 | Youm | A63F 13/44 | 463/4 |
| 8,602,859 B2 * | 12/2013 | Nomura | A63F 13/58 | 463/9 |
| 8,616,980 B2 * | 12/2013 | Theimer | A63F 13/795 | 463/42 |
| 8,632,072 B2 * | 1/2014 | Loveland | A63F 9/1204 | 273/157 R |
| 8,678,904 B1 * | 3/2014 | Sidhu | A63F 13/837 | 463/16 |
| 8,696,469 B2 * | 4/2014 | Youm | A63F 13/497 | 463/4 |
| 8,715,077 B2 * | 5/2014 | Paradise | A63F 13/48 | 463/31 |
| 8,721,413 B2 * | 5/2014 | Mohammed | A63F 9/10 | 463/9 |
| 8,745,138 B2 * | 6/2014 | Feng | A63F 13/12 | 709/204 |
| 8,784,181 B2 * | 7/2014 | Caputo | A63F 13/55 | 463/16 |
| 8,862,523 B2 * | 10/2014 | Richardson | G06N 20/00 | 709/217 |
| 9,079,097 B2 * | 7/2015 | Hansson | A63F 13/45 | |
| 9,079,100 B2 * | 7/2015 | Watabe | A63F 13/2145 | |
| 9,098,130 B2 * | 8/2015 | Miyachi | A63F 13/426 | |
| 9,100,249 B2 * | 8/2015 | Koster | H04L 67/131 | |
| 9,138,641 B2 * | 9/2015 | Rogers | G06T 7/60 | |
| 9,153,075 B2 * | 10/2015 | Ueno | G06F 3/011 | |
| 9,168,456 B2 * | 10/2015 | Caputo | G07F 17/32 | |
| 9,186,587 B2 * | 11/2015 | Jalili | A63F 9/24 | |
| 9,218,717 B2 * | 12/2015 | Indrakumar | G07F 17/3258 | |
| 9,240,101 B2 * | 1/2016 | Paradise | A63F 13/48 | |
| 9,259,647 B2 * | 2/2016 | Tada | A63F 13/46 | |
| 9,327,190 B2 * | 5/2016 | Yoshizawa | A63F 13/45 | |
| 9,339,725 B2 * | 5/2016 | Ohta | A63F 13/424 | |
| 9,352,213 B2 * | 5/2016 | Yim | G06F 3/0482 | |
| 9,373,213 B1 * | 6/2016 | Archer | A63F 13/42 | |
| 9,403,087 B2 * | 8/2016 | Riley | G06F 16/444 | |
| 9,443,192 B1 * | 9/2016 | Cosic | G06N 5/048 | |
| 9,446,319 B2 * | 9/2016 | Barney | A63F 13/25 | |
| 9,508,224 B2 * | 11/2016 | Russell | H04L 67/14 | |
| 9,517,412 B2 * | 12/2016 | Rogers | G06T 7/73 | |
| 9,530,281 B2 * | 12/2016 | Basallo | A63F 13/837 | |
| 9,545,563 B2 * | 1/2017 | Yim | A63F 13/537 | |
| 9,550,121 B2 * | 1/2017 | Koster | A63F 13/352 | |
| 9,600,978 B2 * | 3/2017 | Acres | A63F 13/2145 | |
| 9,610,507 B2 * | 4/2017 | Watabe | A63F 13/57 | |
| 9,619,941 B2 * | 4/2017 | Ueno | G02B 27/02 | |
| 9,623,330 B2 * | 4/2017 | Yoshizawa | A61B 5/7475 | |
| 9,649,564 B2 * | 5/2017 | Paradise | A63F 13/61 | |
| 9,682,311 B2 * | 6/2017 | Gilliland | G07F 17/3267 | |
| 9,687,729 B2 * | 6/2017 | Hansson | A63F 13/55 | |
| 9,717,984 B1 * | 8/2017 | Barki | A63F 13/822 | |
| 9,757,645 B2 * | 9/2017 | Seo | G06F 21/36 | |
| 9,757,646 B2 * | 9/2017 | Dumitrescu | G06F 3/0486 | |
| 9,786,120 B2 * | 10/2017 | Russell | G07F 17/3244 | |
| 9,808,715 B2 * | 11/2017 | Searchfield | A63F 9/24 | |

(56) References Cited

U.S. PATENT DOCUMENTS

| | | | |
|---|---|---|---|
| 9,854,065 B2* | 12/2017 | Koster | G06F 3/04815 |
| 9,861,882 B2* | 1/2018 | Yim | A63F 13/5375 |
| 9,886,817 B2* | 2/2018 | Acres | A63F 13/2145 |
| 9,919,224 B2* | 3/2018 | Mott | A63F 13/822 |
| 9,968,850 B2* | 5/2018 | Koster | A63F 13/57 |
| 9,993,724 B2* | 6/2018 | Barney | A63F 13/92 |
| 10,086,270 B2* | 10/2018 | Fujita | A63F 13/42 |
| 10,121,309 B2* | 11/2018 | Acres | G07F 17/3213 |
| 10,179,288 B2* | 1/2019 | Maietti | A63F 13/31 |
| 10,192,173 B2* | 1/2019 | Stephens | G06N 5/04 |
| 10,232,261 B2* | 3/2019 | Yim | G06F 3/0488 |
| 10,238,967 B2* | 3/2019 | Yim | A63F 13/5378 |
| 10,265,612 B2* | 4/2019 | Hansson | A63F 13/55 |
| 10,290,179 B2* | 5/2019 | Paradise | A63F 13/70 |
| 10,328,348 B2* | 6/2019 | Hisaoka | A63F 13/77 |
| 10,373,422 B2* | 8/2019 | Acres | G07F 17/3295 |
| 10,384,136 B2* | 8/2019 | Chae | G06F 16/244 |
| 10,434,415 B1* | 10/2019 | Barki | A63F 13/847 |
| 10,463,951 B1* | 11/2019 | Su | A63F 9/0073 |
| 10,537,789 B2* | 1/2020 | Park | A63F 13/35 |
| 10,549,190 B2* | 2/2020 | Kamobayashi | A63F 13/426 |
| 10,549,199 B2* | 2/2020 | Basallo | A63F 13/837 |
| 10,581,592 B2* | 3/2020 | Bisti | H04L 9/3297 |
| 10,583,357 B2* | 3/2020 | Barney | A63F 13/235 |
| 10,592,822 B1* | 3/2020 | Cosic | G06N 20/00 |
| 10,675,531 B2* | 6/2020 | Gustafsson | A63F 13/60 |
| 10,709,978 B2* | 7/2020 | Yoshizawa | A61B 5/6897 |
| 10,709,986 B2* | 7/2020 | Maietti | A63F 13/31 |
| 10,748,373 B2* | 8/2020 | Paradise | A63F 13/00 |
| 10,758,826 B2* | 9/2020 | Sefcik | A63F 13/60 |
| 10,792,563 B2* | 10/2020 | Fujita | A63F 13/69 |
| 10,828,558 B2* | 11/2020 | Hansson | A63F 13/57 |
| 10,835,824 B2* | 11/2020 | Laker | A63F 13/35 |
| 10,835,827 B1* | 11/2020 | Pather | A63F 13/87 |
| 10,835,828 B1* | 11/2020 | Pather | A63F 13/213 |
| D903,778 S * | 12/2020 | Nevgi | A63F 9/12 D21/479 |
| 10,864,440 B2* | 12/2020 | Yim | A63F 13/23 |
| 10,874,949 B2* | 12/2020 | Vaccari | H04L 51/52 |
| 10,874,950 B2* | 12/2020 | Vaccari | A63F 13/92 |
| 10,874,277 B2* | 12/2020 | Vaccari | H04L 67/53 |
| 10,918,937 B2* | 2/2021 | Nelson, Jr. | A63F 13/335 |
| 10,918,938 B2* | 2/2021 | Karlsson | A63F 13/352 |
| 10,933,327 B2* | 3/2021 | Karlsson | A63F 13/35 |
| 10,967,275 B2* | 4/2021 | Hisaoka | A63F 13/77 |
| 10,967,277 B2* | 4/2021 | Patel | A63F 13/795 |
| 11,000,758 B2* | 5/2021 | Kim | A63F 9/0612 |
| 11,011,011 B2* | 5/2021 | Acres | G07F 17/3225 |
| 11,044,075 B2* | 6/2021 | Bisti | H04L 9/3236 |
| 11,045,721 B2* | 6/2021 | Gustafsson | G06F 3/04883 |
| 11,062,569 B2* | 7/2021 | Paradise | A63F 13/79 |
| 11,103,779 B2* | 8/2021 | Kamobayashi | A63F 13/45 |
| 11,110,353 B2* | 9/2021 | Somers | A63F 13/67 |
| 11,154,786 B2* | 10/2021 | Yoo | A63F 13/795 |
| 11,173,386 B2* | 11/2021 | Nevgi | A63F 9/1208 |
| 2005/0124401 A1* | 6/2005 | Izuno | A63F 13/45 463/7 |
| 2006/0094502 A1* | 5/2006 | Katayama | A63F 13/2145 463/31 |
| 2006/0178213 A1* | 8/2006 | Ohta | A63F 13/215 463/37 |
| 2008/0211768 A1 | 9/2008 | Breen et al. | |
| 2009/0076784 A1* | 3/2009 | Ong | A63F 13/45 706/62 |
| 2010/0022304 A1* | 1/2010 | Katayama | A63F 13/2145 463/31 |
| 2012/0259603 A1* | 10/2012 | Ong | A63F 13/216 703/6 |
| 2012/0306775 A1* | 12/2012 | Miyachi | A63F 13/2145 345/173 |
| 2013/0210520 A1* | 8/2013 | Yonezu | A63F 13/95 463/31 |
| 2014/0370950 A1* | 12/2014 | Hansson | A63F 13/00 463/9 |
| 2015/0038223 A1* | 2/2015 | Watabe | A63F 13/57 463/31 |
| 2015/0141148 A1* | 5/2015 | Hansson | A63F 13/23 463/36 |
| 2015/0273343 A1* | 10/2015 | Watabe | A63F 13/95 463/31 |
| 2015/0290545 A1* | 10/2015 | Barney | A63F 13/21 463/31 |
| 2016/0067593 A1* | 3/2016 | Yim | A63F 13/40 463/31 |
| 2016/0067604 A1* | 3/2016 | Yim | G06F 3/048 463/31 |
| 2016/0067608 A1* | 3/2016 | Yim | A63F 13/53 463/31 |
| 2016/0243434 A1* | 8/2016 | Yim | A63F 13/40 |
| 2017/0065879 A1* | 3/2017 | Barney | A63F 13/73 |
| 2017/0120148 A1* | 5/2017 | Yim | A63F 13/40 |
| 2017/0246530 A1* | 8/2017 | Hansson | A63F 13/52 |
| 2019/0009171 A1* | 1/2019 | Barney | A63F 13/822 |
| 2019/0176024 A1* | 6/2019 | Hansson | A63F 13/2145 |
| 2019/0217195 A1* | 7/2019 | Yim | A63F 3/00697 |
| 2020/0330857 A1* | 10/2020 | Barney | A63F 13/822 |
| 2021/0121779 A1* | 4/2021 | Yim | A63F 13/65 |
| 2021/0187395 A1* | 6/2021 | Inaba | A63F 13/95 |

FOREIGN PATENT DOCUMENTS

| | | |
|---|---|---|
| JP | 2007313024 A | 12/2007 |
| TW | 200832192 A | 8/2008 |

OTHER PUBLICATIONS

International Search Report and translation (PCT/ISA/210) and Written Opinion (PCT/ISA/237) dated Nov. 19, 2019 for International Application No. PCT/JP2019/035145, 9 pages (2 pages of English Translation and 7 pages of Official copy).

Non-Final Office Action received for U.S. Appl. No. 17/191,616, dated Dec. 24, 2021, 18 pages.

Notice of Allowance received for U.S. Appl. No. 17/191,616, dated Apr. 14, 2022, 25 Pages.

Itakahashikun, "Birzzle: The puzzle that drags birds and erases them, Addictive enough to get your hand peritendinitis!1173" (non-official translation), AppBank [online], Apr. 26, 2011, [retrieved on Oct. 9, 2019], retrieved from <URL: http://www.appbank.net/2011/04/26/iphone-application/247168.php>, 9 pages.

Lumines, Dengeki PSP, Jun. 17, 2005, vol. 11, No. 18, pp. 68-69.

Mikishiro, "a block puzzle 'Block Bank 3×3' that is arranged in Tetris type" (non-official translation), isuta [online], Apr. 2, 2016, [retrieved on Oct. 9, 2019], retrieved from <URL: https://isuta.jp/category/iphone/2016/04/482555>, 5 pages.

* cited by examiner

RECORDING MEDIUM AND GAME CONTROL METHOD

CROSS-REFERENCE TO RELATED APPLICATION(S)

This application is a continuation of U.S. patent application Ser. No. 17/191,616 filed on Mar. 3, 2021, which is a by-pass continuation-in part (CIP) application of International Patent Application No. PCT/JP2019/035145 filed on Sep. 6, 2019, which claims priority to and the benefit of Japanese Patent Application No. 2018-167186 filed on Sep. 6, 2018, the entire disclosures of which are incorporated herein by reference.

BACKGROUND OF THE INVENTION

Field of the Invention

The present invention relates to a recording medium and a game control method, and particularly relates to an electronic game that proceeds as a result of arranging objects on a board surface.

Description of the Related Art

In the field of electronic games, there is a game genre that is so-called a falling block puzzle game, which proceeds as a result of a user moving and rotating objects such as pieces or men that sequentially fall in a limited space (field), and arranging and thus stacking these objects at any positions, as in Japanese Patent Laid-Open No. 08-276069. In a falling block puzzle game, basically, the game ends if falling objects cannot be arranged into the field, but stacked objects disappear if these objects satisfy a predetermined condition. That is to say, since an "empty space" can be generated in the field by using the disappearance, more objects can then be arranged into the field, and, as a result, the play time can be extended.

The falling block puzzle games also include one in which, if a gap is present in a falling direction when a falling object is arranged or arranged objects disappear, processing to separately move elements that constitute an object and arrange these elements so as to fill the gap is performed. According to such processing, a situation in which the disappearance condition is satisfied can be sequentially caused in the field, it then becomes easier to generate the "empty space" in the field, and it is expected that the game becomes more appealing.

However, it is difficult to play the game while considering the direction in which objects fall or deformation of an object after being arrange or after falling as in the falling block puzzle games, which may limit and the user base.

The present invention has been made in view of the foregoing problem, and an object of the invention is to provide a recording medium and a game control method that enable disappearance of objects to be intuitively perceived and make gameplay more appealing.

SUMMARY OF THE INVENTION

The present invention in its first aspect provides a non-transitory computer-readable recording medium storing a game program for causing a computer, which realizes an electronic game that proceeds as a result of objects being arranged in a game field in which squares with a predetermined size are provided in a form of a lattice grid, to execute: processing for arranging, in the game field, an arrangement object constituted by a plurality of unit elements having the same shape and the same size as each of the squares being combined; processing for determining whether or not a group of unit elements arranged adjacent to each other in the game field forms a predetermined shape; processing for managing a region including the group of unit elements that forms the predetermined shape in the game field as an erasure-determined region, and identifiably presenting the erasure-determined region; processing for erasing, from the game field, the group of unit elements included in the erasure-determined region, of groups of unit elements arranged in the game field, if the erasure-determined region satisfies a predetermined condition, and leaving unit elements that are not included in the erasure-determined region, in squares in which these unit elements are arranged; and processing for performing control such that a new arrangement object can be arranged in squares from which the group of unit elements included in the erasure-determined region have been erased.

The present invention in its second aspect provides a game control method for an information processing device for realizing an electronic game that proceeds as a result of objects being arranged in a game field in which squares with a predetermined size are provided in a form of a lattice grid, the method comprising: an arrangement step of arranging, in the game field, an arrangement object constituted by a plurality of unit elements having the same shape and the same size as each of the squares being combined; a step of determining whether or not a group of unit elements arranged adjacent to each other in the game field in the arrangement step forms a predetermined shape; a step of managing a region including the group of unit elements that forms the predetermined shape in the game field as an erasure-determined region, and identifiably presenting the erasure-determined region; a step of erasing, from the game field, the group of unit elements included in the erasure-determined region, of groups of unit elements arranged in the game field, if the erasure-determined region satisfies a predetermined condition, and leaving unit elements that are not included in the erasure-determined region, in squares in which these unit elements are arranged; and a step of performing control such that a new arrangement object can be arranged in squares from which the group of unit elements included in the erasure-determined region have been erased.

Further features of the present invention will become apparent from the following description of exemplary embodiments (with reference to the attached drawings). Note that, in the attached drawings, the same or similar configurations are assigned the same reference numerals.

DESCRIPTION OF THE EMBODIMENTS

Embodiment

Hereinafter, an example embodiment of the present invention will be described in detail with reference to the drawings. Note that the following embodiment will describe an example of applying the present invention to a smartphone that serves as an example of a device that executes a game program, includes a touch operation interface, and can execute applications including the game program according to the present invention. However, the present invention can be applied to any devices capable of executing a game program and providing gameplay.

Configuration of Smartphone 100

Figure 1:
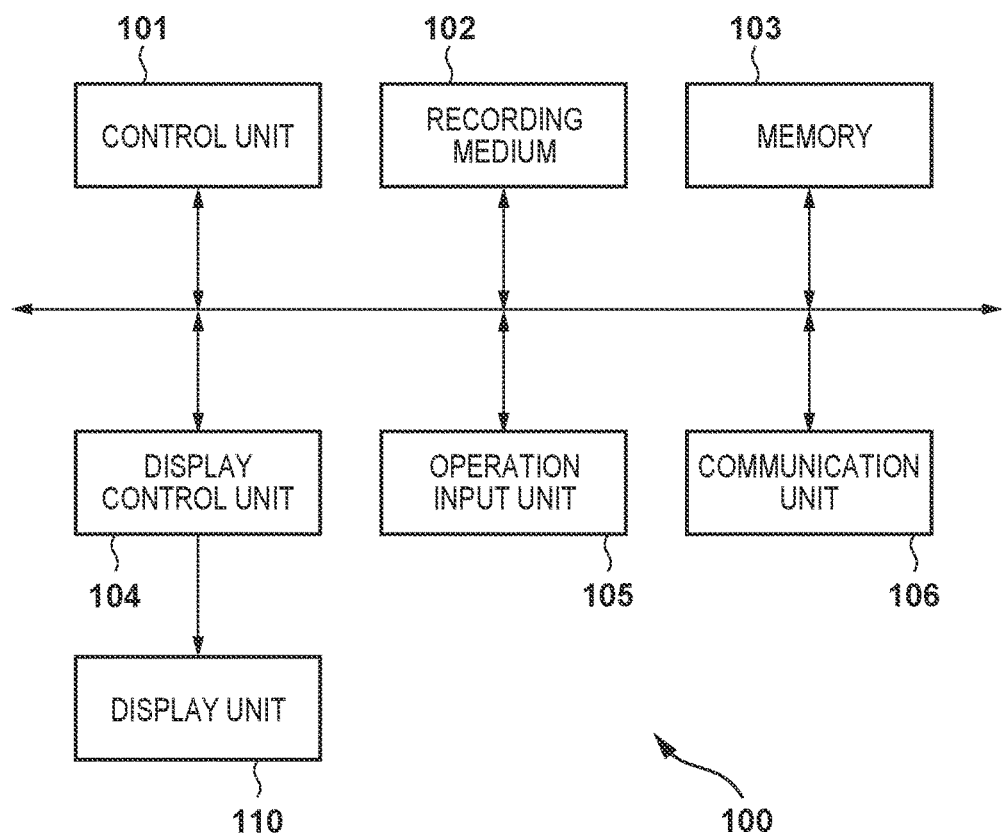
FIG. 1 is a block diagram showing a functional configuration of a smartphone 100 according to an embodiment of the present invention.

FIG. 1 is a block diagram illustrating a functional configuration of a smartphone 100 according to the embodiment of the present invention.

A control unit 101 is, for example, a CPU, and controls operations of each block of the smartphone 100. Specifically, for example, the control unit 101 controls operations of each block by reading out an operation program for each block or an application program for a puzzle game according to the present invention that are recorded in a recording medium 102, loading the program to a memory 103, and executing the loaded program.

The recording medium 102 is, for example, a recording device capable of permanently holding data, such as a nonvolatile memory or an HDD. The recording medium 102 records information such as parameters or the like required for operations of each block, the application program for the puzzle game of the present embodiment, various GUIs, rendering objects, and so on that are used in the puzzle game, in addition to the operation program for each block of the smartphone 100. The memory 103 is, for example, a storage device that is used to temporarily store data, such as a volatile memory. The memory 103 is used as not only an area to which the operation program for each block is loaded, but also a storage area for temporarily storing data or the like that is output in the process of operations of each block.

A display control unit 104 controls presentation of various kinds of information to a user of the smartphone 100. Although the smartphone 100 of the present invention is described as having a display unit 110 for displaying images (game screen, menu screen etc.) as means for presenting various kinds of information to the user, needless to say, the means for presenting information is not limited thereto, and sound output, vibration, lighting, transmission of information, or the like may replace or be added to the means.

The display control unit 104 includes a rendering device such as a GPU, for example, and performs predetermined rendering processing when generating various screens to be displayed on the display unit 110. Specifically, when an application program is being executed for the puzzle game, the display control unit 104 generates a game screen corresponding to the state of progress of the puzzle game, and presents various kinds of information related to the puzzle game by updating the display on the display unit 110 at a predetermined frequency. In the puzzle game, play experience of which is provided on the smartphone 100 of the present embodiment, although the details will be described later, upon a predetermined play related to the puzzle game being started, game screens to be displayed on the display unit 110 are sequentially generated in accordance with an elapsed time, operation input that has been made, and achieved conditions. The display control unit 104 loads necessary rendered objects and GUI data to a GPU memory (not shown) and generates the game screens by performing rendering processing.

Although the present embodiment describes the smartphone 100 whose display unit 110 is an integrated display device such as an LCD that is contained in the smartphone 100, the implementation of the present invention is not limited thereto. That is, needless to say, the display unit 110 may alternatively be an external display device that is removably connected to the smartphone 100.

An operation input unit 105 is a user interface of the smartphone 100 that is an operation button, a touch panel for detecting a touch operation performed on the screen of the display unit 110, or the like. Upon detecting that operation input has been made by the user, the operation input unit 105 transmits a control signal corresponding to the content of the operation to the control unit 101. Although the present embodiment describes that the user interface included in the smartphone 100 basically accepts a touch operation, this is simply one mode of an intuitive operation interface, and needless to say, the implementation of the present invention is not limited thereto.

A communication unit 106 is a communication interface of the smartphone 100 for transmitting and receiving information. In the present embodiment, the smartphone 100 is configured to be able to perform communication in a predetermined communication method in order to realize communication with external devices via a network (not shown). That is to say, the smartphone 100 is configured to be able to transmit and receive information via the communication unit 106. In the present embodiment, the communication unit 106 is configured to be able to transmit and receive information to and from a predetermined game server or another smartphone 100 in a later-described multiplayer mode.

Summary of Game

The puzzle game according to the present embodiment is a board game in which, unlike a falling block puzzle game such as that of Japanese Patent Laid-Open No. 08-276069, movement of an arranged object in a specific direction does not occur, and the game proceeds as a result of arranging objects at any positions in a limited field (board surface).

Figure 2:
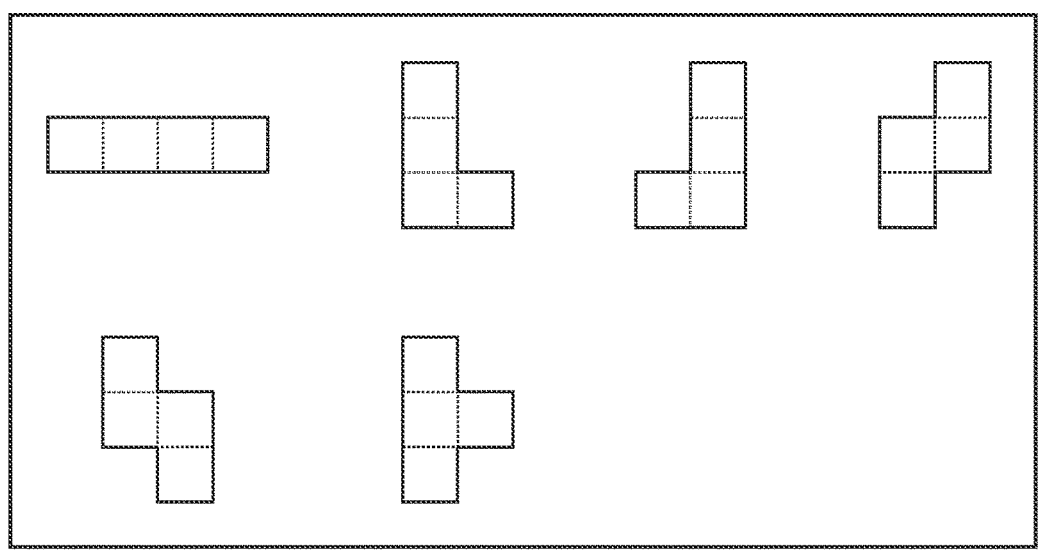
FIG. 2 is a diagram for illustrating objects (tetrominoes) to be arranged into a field in a puzzle game according to the embodiment of the present invention.

Since the puzzle game employs a mode in which arrangement objects can be arranged into the filed while being rotated by 90 degrees at a time as shown in FIG. 2, it is assumed that a unit element (mino) has a square shape, and each of a plurality of minoes is at least connected to another mino at a side of the square and two vertices on this side. In the present embodiment, each arrangement object is constituted by four minoes, and is hereinafter referred to as a "tetromino". However, needless to say, the number of minoes that constitute each arrangement object is not limited thereto.

Figure 3A:
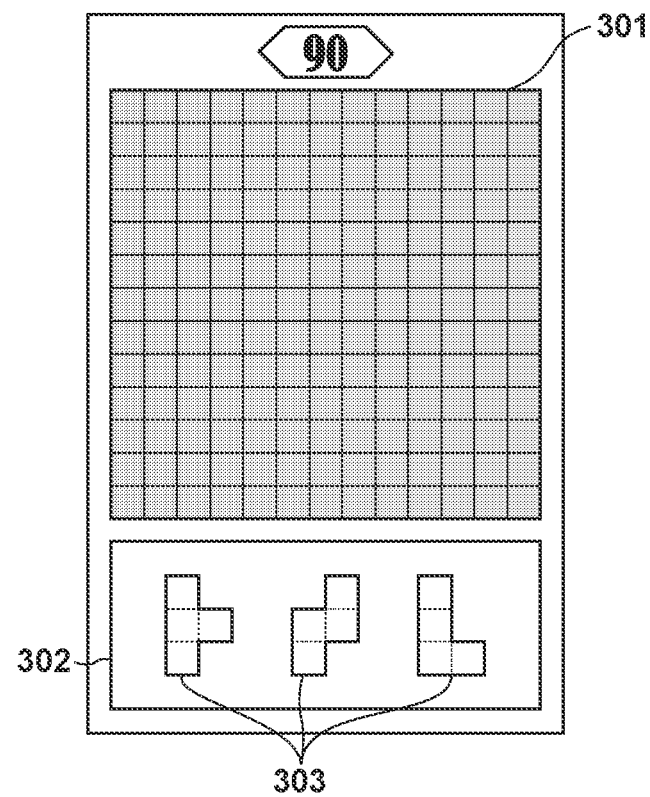
FIG. 3A shows an example of a screen configuration of the puzzle game according to the embodiment of the present invention.

The field in which tetrominoes are to be arranged has a lattice grid, and the location in which tetrominoes can be arranged is clearly indicated, as shown in FIG. 3A. One square on a field 301 has the same size as one mino. In the puzzle game of the present embodiment, tetrominoes are controlled such that the minoes thereof can be arranged in a state of being accommodated in respective squares in the field 301, as shown in FIG. 3B.

Figure 3B:
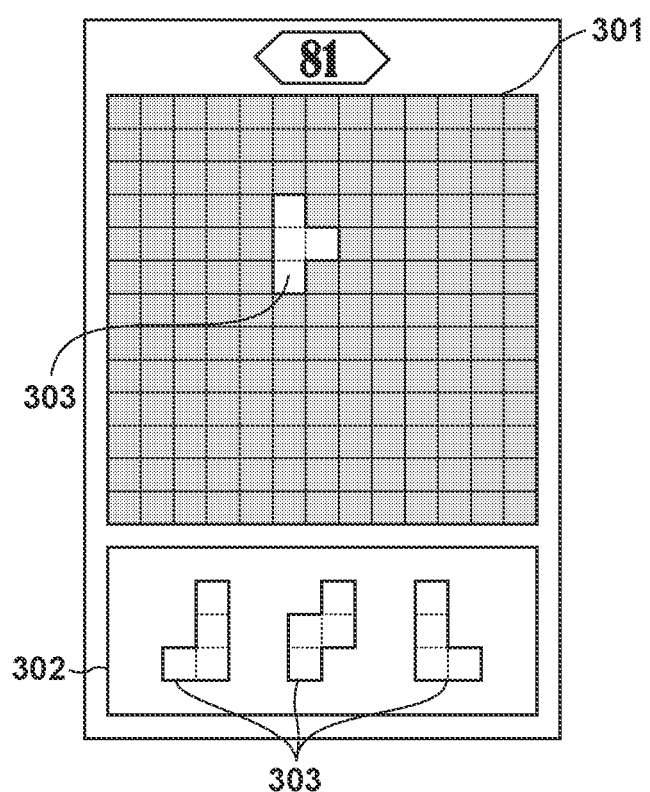
FIG. 3B shows an example of a screen configuration of the puzzle game according to the embodiment of the present invention.

As shown in FIGS. 3A and 3B, during gameplay, a predetermined number of (in the example in these drawings, three) tetrominoes 303 that are to be arranged into the field are presented in an arrangement mino area 302, and the progress of the puzzle game is controlled such that an operation to arrange these tetrominoes can be performed. The user can arrange the tetrominoes 303 presented in the arrangement mino area 302 into the field 301 one-by-one by performing a drag and drop operation, and upon one tetromino being arranged, the arrangement mino area 302 is replenished by one new tetromino 303 such that the predetermined number of tetrominoes are presented therein. That is to say, three tetrominoes 303 are always presented in the arrangement mino area 302 at a timing at which the user can arrange a tetromino.

When a tetromino 303 is arranged into the field 301, each tetromino 303 can be rotated by 90 degree at a time, as mentioned above. Basically, the tetromino 303 is rotated by 90 degrees at a time in a predetermined direction by, for example, performing a single-tap operation on a target tetromino 303 in the arrangement mino area 302. In addition, in order to enable rotation of the target tetromino 303 while checking the arrangement state of the minoes after moving the tetromino 303 into the field 301, the puzzle game of the present embodiment employs the following configuration such that the tetromino can be rotated even after the drag and drop operation has been performed on the tetromino 303 from the arrangement mino area 302.

Figure 4A:
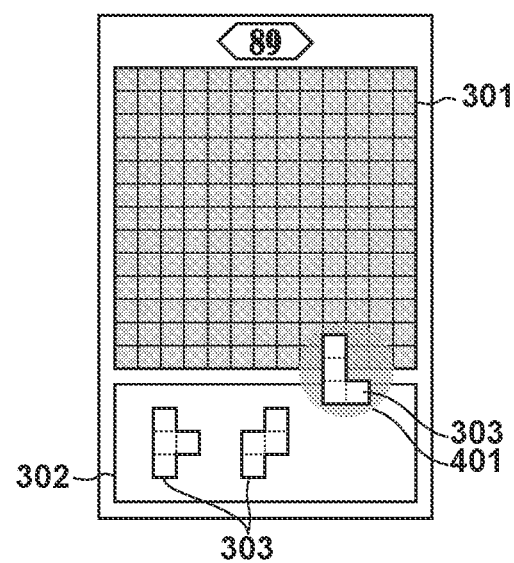
FIG. 4A is a diagram for illustrating an arrangement of tetrominoes in the puzzle game according to the embodiment of the present invention.

Upon a touch operation being performed on a tetromino 303 in relation to a start of dragging in the arrangement mino area 302, the tetromino 303 enters a selected state, a circle 401 is displayed around this tetromino as shown in FIG. 4A and is thus distinguished from the other tetrominoes 303. The tetromino 303 in the selected state can be moved to the field 301 by performing a drag operation, and the arrangement thereof in the field 301 enters a provisionally determined state by performing a drop operation (touch-up: cancellation of the touched state) in the region of the field 301.

Figure 4B:
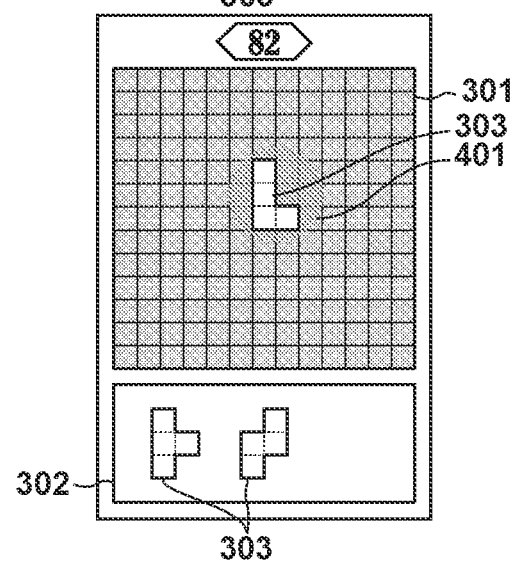
FIG. 4B is a diagram for illustrating an arrangement of tetrominoes in the puzzle game according to the embodiment of the present invention.

Here, the tetromino 303 is displayed in the field 301 in a state where the circle 401 remains attached thereto as shown in FIG. 4B, and the selected state and the provisionally determined state are maintained until a predetermined determination grace period elapses. During the period in which the tetromino 303 is in the provisionally determined state, the tetromino 303 can be rotated by 90 degree at a time by performing a single-tap operation on the circle 401 in the same manner as in the arrangement mino area 302, and if a drag operation is performed starting from a touch operation on this circle 401, the provisionally determined state is canceled, and the tetromino 303 can be moved to other positions in the field 301. That is to say, the circle 401 functions to notify the user that the arrangement of the tetromino has not been determined, and the tetromino can also be moved and rotated again in the field after the movement.

The tetromino 303 that has been arranged into the field 301 in the provisionally determined state or the tetromino 303 that is in the selected state and being subjected to a drag operation can be restored to an unselected state and returned to the arrangement mino area 302, rather than being arranged into the field 301, by performing a drag and drop operation to move this tetromino out of the field 301.

Transition from the provisionally determined state to a determined state, i.e., arrangement of a tetromino into the field 301 may be immediately performed by an operation other than a lapse of the determination grace period that is determined regarding the provisionally determined state, in order to make the game more appealing. For example, in the puzzle game of the present embodiment, if a tetromino 303 in the provisionally determined state is arranged in the field 301, this tetromino 303 transitions to the determined state upon a touch operation being performed to move the tetromino in the field 301 to a region outside the circle 401, and the arrangement is immediately performed. At this time, the selected state of the tetromino is canceled upon the tetromino entering the determined state.

Note that, although the details will be described later, a condition under which a tetromino can be arranged into the field 301 is predetermined in the puzzle game of the present embodiment, and even if a tetromino 303 is dropped into the field 301, this tetromino cannot necessarily be arranged (control to transition to either the determined state or the provisionally determined state is not performed).

In the puzzle game of the present embodiment, the condition (arrangeability condition) under which a tetromino 303 can be arranged into the field 301 includes that, in a state where a mino has already been arranged in any of the squares in the field 301, at least one of the vertices and sides of a tetromino 303 to be arranged (the vertices and sides that form the perimeter of this tetromino) comes into contact with at least one of the vertices and sides of the already-arranged mino. The arrangeability condition further includes that no other minoes have already been arranged in the squares in the field 301 in which the tetromino 303 is to be arranged. That is to say, each of the squares in the field 301 is, for example, associated with logical information (arrangement flag) indicating whether or not a mino is arranged therein, and a square in which a mino is already arranged (a square with an arrangement flag indicating "true") is controlled such that no other mino can be arranged in this square on top of the already-arranged mino. On the other hand, the arrangeability condition is not particularly provided at the beginning of the game and when in a state where no other minoes are arranged in any squares in the field 301.

Figure 4C:
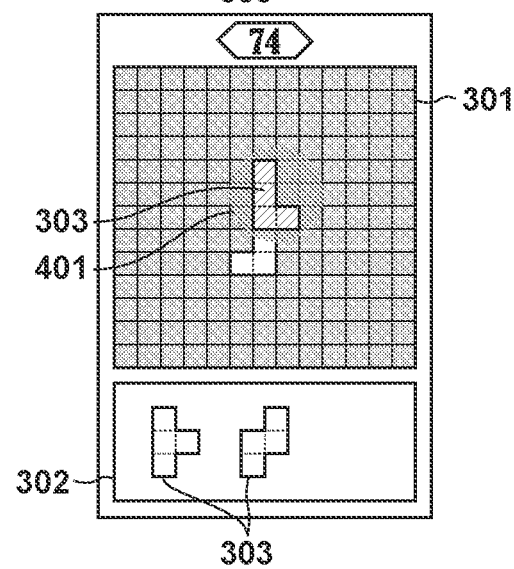
FIG. 4C is a diagram for illustrating an arrangement of tetrominoes in the puzzle game according to the embodiment of the present invention.

When a drop operation is performed to move a tetromino 303 into the field 301, the tetromino is managed as being in an error state if the tetromino does not satisfy the arrangeability condition, and a notification that the tetromino cannot be arranged is given by differently coloring the tetromino 303 as shown in FIG. 4C, for example.

If the target tetromino 303 is in an error state, control to forcibly restore this tetromino to an unselected state and return the tetromino to the arrangement mino area 302 after no operation has been performed on the tetromino and the circle 401 and a predetermined impossibility notification period has elapsed. Alternatively, if a touch operation is performed on a region outside the circle 401 in the field 301, processing for restoring the tetromino to an unselected state may be similarly performed without waiting for a lapse of the impossibility notification period.

In such a configuration in which a new mino cannot be arranged on top of an already-arranged mino in the field 301, since the field 301 is constituted by a limited region, the number of times that the user can arrange tetrominoes is limited. That is to say, the play time of the game is determined in accordance with the number of squares provided in the field 301, which may reduce the user's interest.

To avoid such a limitation on the play time, the puzzle game of the present embodiment is configured such that if a situation arises in which minoes arranged in the field 301 satisfy a predetermined condition, the minoes that satisfy the condition are erased from the field 301. In other words, an erasure condition is provided regarding minoes arranged in the field 301, and the user can sequentially increase squares in an empty state (in a state where no mino is arranged therein) in the field 301 by arranging tetrominoes 303 such that the condition is satisfied, and can play the game for a longer period of time.

Erasure Condition

A description will be given below, using the drawings, of the erasure condition under which minoes arranged in the field 301 are erased in the puzzle game of the present embodiment.

Figure 5A:
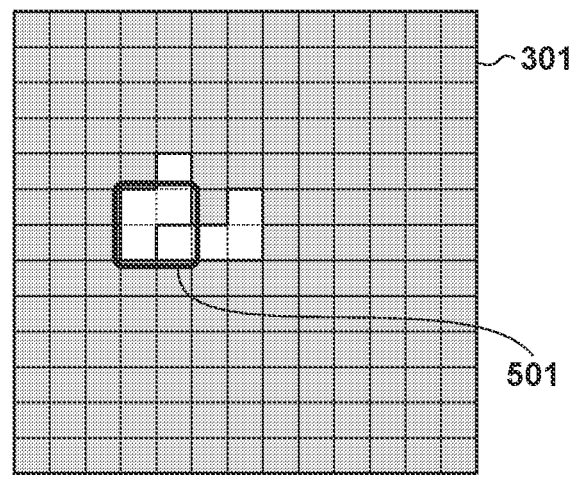
FIG. 5A is a diagram for illustrating erasure of tetrominoes in the puzzle game according to the embodiment of the present invention.

In the puzzle game of the present embodiment, when a tetromino is arranged in the field 301, if adjacent mino groups in the field form a rectangle 501 with two minoes on each side as shown in FIG. 5A, it is determined that the mino group included in this rectangle satisfies the erasure condition. The minoes that thus satisfy the erasure condition are erased from the field 301, the squares in which these minoes have been arranged are controlled to enter a state where tetrominoes 303 can be arranged therein again (the arrangement flag is set to "false"), allowing the user to arrange more tetrominoes 303.

Figure 5B:
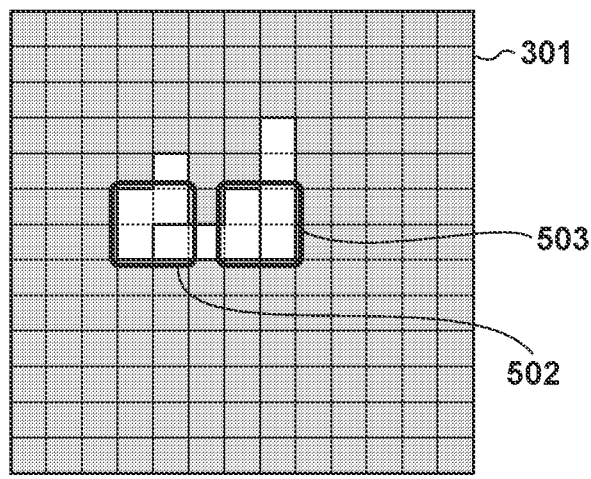
FIG. 5B is a diagram for illustrating erasure of tetrominoes in the puzzle game according to the embodiment of the present invention.
Figure 5C:
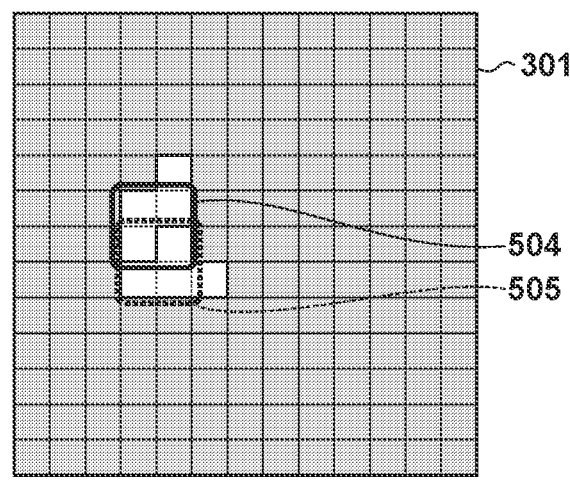
FIG. 5C is a diagram for illustrating erasure of tetrominoes in the puzzle game according to the embodiment of the present invention.

Although FIG. 5A shows an example in which only one rectangle (minimum rectangle) with two minoes×two minoes, which is the minimum unit of erasure, is formed, a plurality of rectangles (minimum rectangles) with two minoes×two minoes that are the minimum units may be simultaneously formed depending on the arrangement mode of minoes in the field 301. A plurality of minimum rectangles may be simultaneously formed independently as indicated by rectangles 502 and 503 in FIG. 5B, or may be formed including shared minoes as indicated by rectangles 504 and 505 in FIG. 5C. Accordingly, such a plurality of minimum rectangles simultaneously satisfy the erasure condition.

In the puzzle game of the present embodiment, in order to make the game more appealing, higher game evaluation is achieved (a higher game score is given) as the number of minoes that are simultaneously erased increases. Meanwhile, in the mode of erasing minoes that satisfy the erasure condition at this point in time, the chances of erasure are limited, and a certain degree of game skill is required to form a plurality of minimum rectangles and acquire a high game score, which may make the game difficult for some users. For this reason, in the puzzle game of the present embodiment, control is performed such that minoes (a rectangle) that form a rectangle and satisfy the erasure condition is regarded as being in an erasure-determined state and remain arranged in the field 301 until a predetermined period (erasure wait period) elapses, rather than being immediately erased.

More specifically, processing is performed for minoes that satisfy the erasure condition and enters the erasure-determined state such that a countdown timer (an initial value of which is the erasure wait period) related to the time until these minoes are erased is set, and the minoes are erased from the field 301 under the condition that the count of this timer reaches zero. For example, the countdown timer is provided and managed for each region in the erasure-determined state (erasure-determined region 602), as indicated by an icon 601 in FIG. 6A. Here, one erasure-determined region is a group of minimum rectangles with respective constituent minoes being adjacent to each other, or a collection of minoes to be simultaneously erased that is a bundle of minimum rectangle groups with common minoes being shared, of the minimum rectangles formed in the field 301 by arranging tetrominoes, and is identifiably presented while being surrounded by a bold frame in the field 301 to let the user know these minoes. For example, in FIG. 6A, only one erasure-determined region 602 is present in the field 301, and only one countdown timer is set, whereas, in FIG. 5B, two countdown timers will be set since two erasure-determined regions are present in the field 301. The icon 601 indicates the remaining time of the countdown timer, and a decrease in the remaining time is presented by the display mode transitioning as shown in FIG. 6B.

That is to say, in the puzzle game of the present embodiment, minoes in the erasure-determined state are present in the field 301 unless the countdown timer reaches zero. For this reason, the user can expand the erasure-determined region by arranging additional tetrominoes such that a new minimum rectangle that comes into contact with these minoes is formed. In other words, even if the erasure condition is satisfied once, another minimum rectangle can be formed using minoes in the erasure-determined state, or another minimum rectangle adjacent to a side of any of the minoes in the erasure-determined region can be formed until the count of the countdown timer reaches zero, and more minoes can be subjected to simultaneous erasure.

Furthermore, in the puzzle game of the present embodiment, if the erasure-determined region is expanded, a countdown timer that starts from the initial value is set again for the expanded erasure-determined region. That is to say, every time the erasure-determined region is expanded, the time until this region (including the erasure-determined region before being expanded) is erased can be reset to the erasure wait period. By employing this configuration, the user can more readily expand the erasure-determined region and achieve higher evaluation, and the user's interest in the game can be readily increased.

Figure 6A:
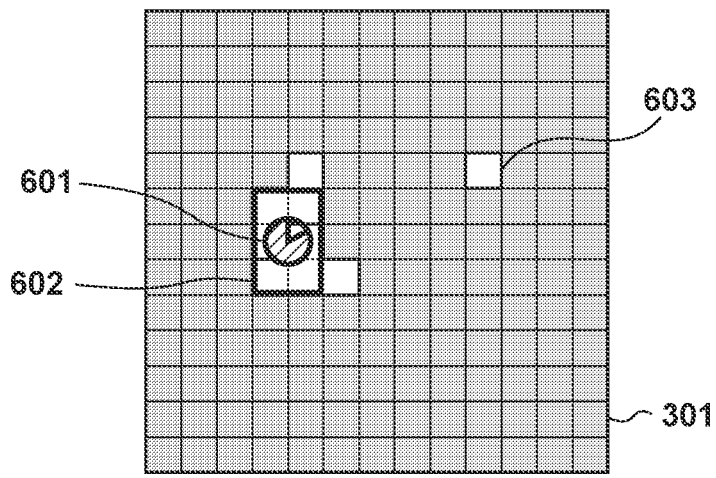
FIG. 6A is another diagram for illustrating erasure of tetrominoes in the puzzle game according to the embodiment of the present invention.
Figure 6B:
FIG. 6B is another diagram for illustrating erasure of tetrominoes in the puzzle game according to the embodiment of the present invention.
Figure 6C:
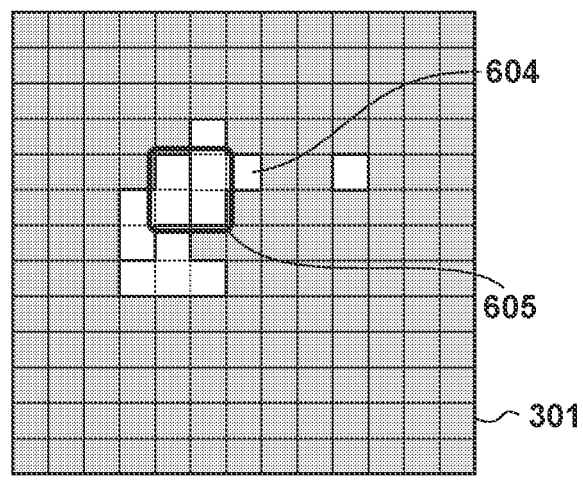
FIG. 6C is another diagram for illustrating erasure of tetrominoes in the puzzle game according to the embodiment of the present invention.
Figure 6D:
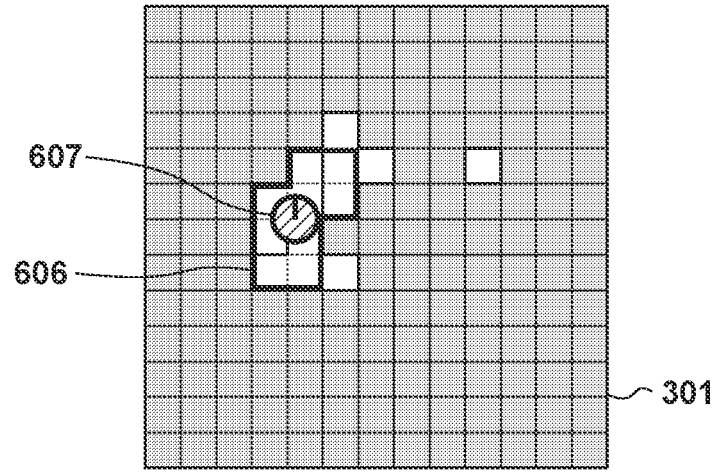
FIG. 6D is another diagram for illustrating erasure of tetrominoes in the puzzle game according to the embodiment of the present invention.

For example, if, in the state shown in FIG. 6A, a tetromino 604 is arranged adjoining an erasure-determined region 602 and a new minimum rectangle 605 is formed as shown in FIG. 6C, an expanded erasure-determined region 606 is newly formed as shown in FIG. 6D, and a countdown timer that starts countdown from the erasure wait period, such as that indicated by an icon 607, is newly set for this region.

Note that a lapse of the erasure wait period does not need to be essential for erasure of minoes in the erasure-determined state. The fewer surplus squares in the field 301 are, it may become more difficult to arrange additional tetrominoes, and, as a result, a situation may arise in which the user needs to wait without causing the state of the field 301 to proceed until the erasure wait period elapses. For this reason, in the puzzle game of the present embodiment, if a different minimum rectangle is formed, minoes in another erasure-determined region that does not include the minimum rectangle that is already present are forcibly erased without waiting for a lapse of the erasure wait period.

Figure 7A:
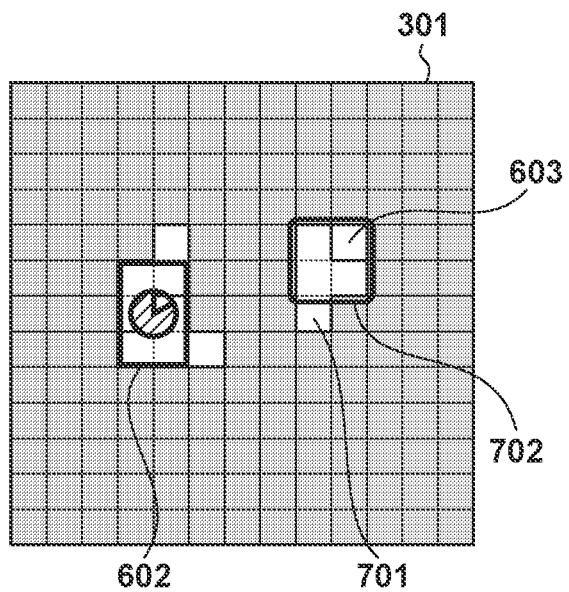
FIG. 7A is yet another diagram for illustrating erasure of tetrominoes in the puzzle game according to the embodiment of the present invention.
Figure 7B:
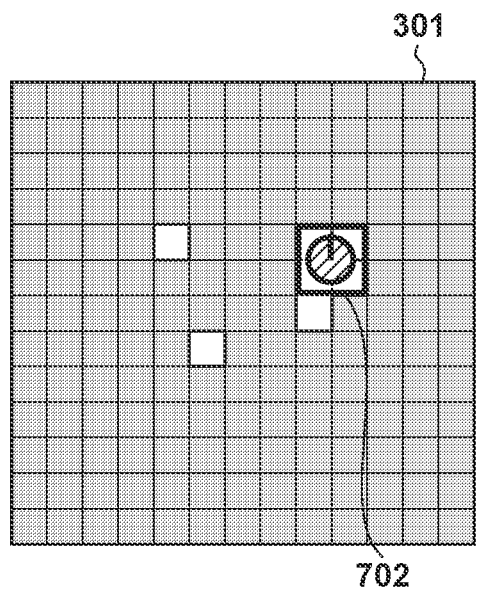
FIG. 7B is yet another diagram for illustrating erasure of tetrominoes in the puzzle game according to the embodiment of the present invention.

For example, under a condition in which, in the state shown in FIG. 6A, a tetromino 701 is arranged with respect to a mino 603 that is arranged separately from the erasure-determined region 602, and a new minimum rectangle 702 is formed as shown in FIG. 7A, the countdown timer for the erasure-determined region 602 is forcibly set to 0, and the minoes included in this region are erased as shown in FIG. 7B.

By employing this configuration, the user can enjoy winning the puzzle game while giving consideration to both achieving high evaluation and arranging more tetrominoes.

Since it is determined whether or not minoes arranged in the field 301 satisfy the erasure condition, i.e., a formed minimum rectangle is searched for every time a tetromino is arranged, a calculation load of search processing may increase depending on the frequency of arranging tetrominoes in the field 301. That is to say, the amount of calculation related to processing to perform all search to check if a minimum rectangle is formed with respect to all squares or all arranged minoes in the field 301 may become excessive, and if such processing is indefinitely permitted, it may wreck the progress of the puzzle game, and may consequently give the user an unfavorable feeling of operation. It is, of course, not necessary to perform the search again to check if a minimum rectangle is formed with respect to minoes included in an erasure-determined region, and therefore, a reduction in the calculation load can be expected if the search is performed only with respect to minoes that constitute an arranged tetromino. Needless to say, however, the calculation load increases if the frequency of arranging tetrominoes is unlimited.

Therefore, in the puzzle game of the present embodiment, after a tetromino is arranged in the field 301 and enters a determined state, a period (arrangement wait period) is set in which an operation related to arrangement of the tetrominoes 303 that are currently arranged in the arrangement mino area 302 into the field 301 is not accepted. Thus, the calculation load can be controlled so as not to become excessive.

Figure 8:
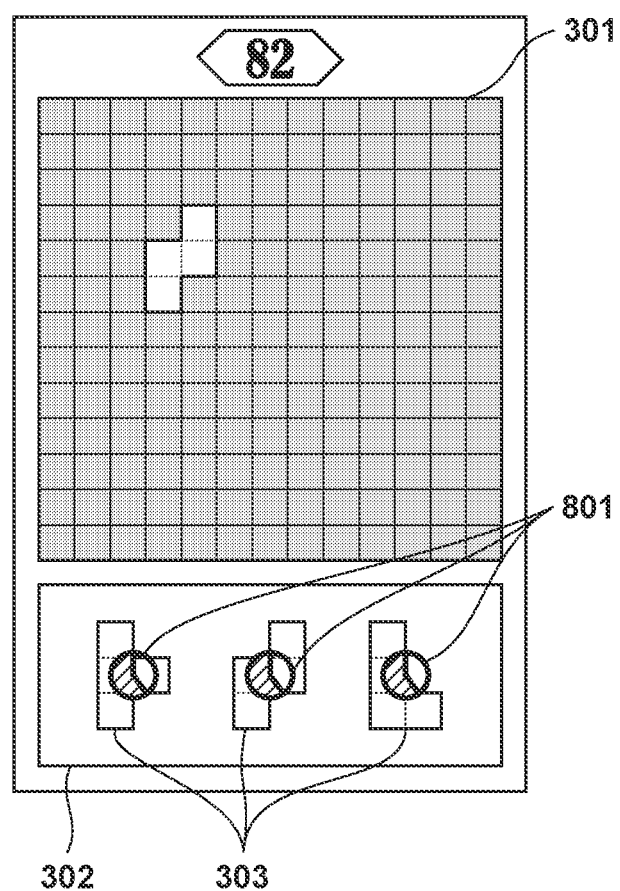
FIG. 8 is a diagram for illustrating various wait periods in the puzzle game according to the embodiment of the present invention.

Here, the arrangement wait period is basically set to be shorter than the erasure wait period, and the user can arrange a tetromino 303 from the arrangement mino area 302 into the field 301 and can expand an erasure-determined region after the arrangement wait period has elapsed. The arrangement wait period for the tetrominoes 303 included in the arrangement mino area 302 may be presented by giving an icon 801 that represents the remaining time until the tetrominoes can be arranged and is similar to the icon given to the erasure-determined region, as shown in FIG. 8. That is to say, if a tetromino arranged in the field 301 enters a determined state, a countdown timer (an initial value of which is the arrangement wait period) is set for each of the tetrominoes 303 included in the arrangement mino area 302, similarly to the erasure-determined region, and an operation to move the tetrominoes related to arrangement thereof is not accepted until the count of the timer reaches zero (an operation to rotate the tetrominoes in the arrangement mino area 302 may be accepted).

Although it is described that, in the puzzle game of the present embodiment, the arrangement wait period is set to be shorter than the erasure wait period such that the erasure-determined region can be expanded, the present invention is not limited thereto. For example, if a specific game effect is occurring, e.g., if an item is being used that is advantageous or disadvantageous for the progress of the puzzle game, the erasure wait period may be set to be longer than the arrangement wait period.

As described above, the control unit 101 realizes, by executing the application program for the puzzle game of the present embodiment, a plurality of functional modules as follows. The plurality of functional modules include:

an arrangement module configured to arrange, in the field 301, a tetromino constituted by a plurality of minos having the same shape and the same size as each of the squares being combined;

a determination module configured to determine whether or not a group of minos arranged adjacent to each other in the field 301 forms a rectangle;

a management module configured to manage a region including the group of minos that forms the rectangle in the field 301 as an erasure-determined region, and identifiably presenting the erasure-determined region;

a erasure module configured to erase, from the field 301, the group of minos included in the erasure-determined region, of groups of minos arranged in the field 301, if the erasure-determined region satisfies a predetermined condition, and leaving minos that are not included in the erasure-determined region, in squares in which these minos are arranged; and a control module configured to control such that a new tetromino can be arranged in squares from which the group of minos included in the erasure-determined region have been erased.

Here, the predetermined condition related to the erasure-determined region includes a condition of a period (erasure wait period) required to elapse until the group of minos included in the erasure-determined region are erased. If, as a result of a new tetromino being arranged, a group of minos including minos in the erasure-determined region and minos constituting the new tetromino forms the rectangle, or if a group of minos including the minos constituting the new tetromino forms the rectangle adjacent to the erasure-determined region, before a lapse of the erasure wait period, the management module expands the erasure-determined region. Then, the management module reset, if the erasure-determined region is expanded, the erasure wait period regarding the erasure-determined region.

The plurality of functional module further include a presentation module configured to present, in the field 301, the erasure wait period regarding the erasure-determined region in association with the erasure-determined region.

If, as a result of the new tetromino being arranged, a group of minos is formed that has the rectangle shape and that does not expand the erasure-determined region that is already present, the erasure module erase the group of minos included in the erasure-determined region independently of a lapse of the erasure wait period.

In addition, the arrangement module requires a lapse of the arrangement wait period for the new tetromino to be able to be arranged next after the tetromino is arranged in the field 301. The arrangement wait period is set to be shorter than the erasure wait period regarding the erasure-determined region.

Note, the implementation of the present invention is not limited to the embodiment in which these functional modules are realized in software by the control unit 101 executing the application program, but may also be realized in other embodiments in which at least some of the functional modules are realized in hardware with equivalent functions.

Game Mode

The puzzle game of the present embodiment is provided with two types of play modes, namely a single-player mode for the user of the smartphone 100 to play the game alone, and a multiplayer mode for playing the game with a user of another smartphone 100 that is connected via a game server, as mentioned above. The mino erasure condition and the operation to arrange tetrominoes in the field 301 are common to both modes, but the goal of the game and score acquisition are different as follows.

Single-Player Mode

In the single-player mode, a predetermined time limit is provided, and the user acquires the score by arranging and erasing tetrominoes in the field 301 within the time limit. During the game, or from the start of the game, obstacles are sequentially arranged in the field 301, and these obstacles can be removed when minos in the field 301 are erased.

A plurality of obstacles with different strengths and removal methods may be provided, and the user causes the game to proceed the game so as to be able to make a high score while removing these obstacles. For example, in one mode, three types of obstacles that are "holes", "gas", and "blocks" are provided in ascending order of strength, i.e., the number of procedures required for removal (erasure of minoes). As for the holes and the gas, of these obstacles, tetrominoes can be arranged in squares in which these obstacles are arranged, and the holes and the gas can be removed by erasing minoes in these squares. More specifically, as for a square in which a hole is arranged, this hole is removed (the square returns to a normal square) when a minimum rectangle that includes this square is formed as a result of a tetromino being arranged and then the minoes are erased. Similarly, as for a square in which gas is arranged, when a minimum rectangle that includes this square is formed as a result of a tetromino being arranged, and then the minoes are erased, the gas is changed to a hole, then this hole is removed, and the square is thus restored to a normal square. Meanwhile, as for a square in which a block is arranged, a tetromino cannot be arranged therein. When an erasure-determined region adjacent to the block is formed, and thereafter the minoes in this region are erased, the block is changed to gas. Thereafter, as described regarding gas, the gas is ultimately changed to a hole, and the square is restored to a normal square by erasing the minoes. Thus, play experience of a puzzle game that is difficult to get bored with can be provided by including an entertainment element of the removal of three types of obstacles.

The condition for clearing the game in the single-player mode may be defined as, for example, having less than a predetermined number of obstacles in the field 301 or removing a certain number of obstacles within a time limit. The game over condition may be satisfied when, for example, the time limit is up without the game clearing condition being satisfied, the ratio of obstacles arranged in the field 301 (the ratio of squares in which obstacles are arranged to all squares) exceeds a predetermined value, or when the game reaches a deadlock (even if the minoes in the erasure-determined region are erased, none of the tetrominoes 303 in the arrangement mino area 302 can be placed in the field 301).

Although the present embodiment describes, as one mode of the single-player mode, that the performance is judged based on the score that has been acquired until the aforementioned game clearance condition is satisfied, for example, the performance may alternatively be judged based on the time required until the game clearance condition is satisfied.

Multiplayer Mode

On the other hand, in the multiplayer mode, a predetermined time limit is provided, and the game proceeds as a result of two users alternately arranging tetrominoes 303 from respective arrangement mino areas 302 into the field 301 within the time limit. The tetrominoes arranged in the field 301 have colors that are set for the respective users, and when a tetromino is arranged, the user who arranges this tetromino can be identified. In the multiplayer mode, minoes can be erased as a result of a minimum rectangle being formed with minoes of the same color, and the user who acquires a larger score is a winning user.

At the time of arrangement, the condition for arranging a tetromino 303 is that the tetromino 303 is basically required to be adjacent to at least one of the vertices and sides of any of the already-arranged minoes, as described above. However, the already-arranged minoes may have either color. That is to say, the user can arrange a tetromino 303 so as to be adjacent to ay least one of the vertices and sides of not only minoes arranged in the field 301 by the user himself but also minoes arranged by the opponent user.

In order to make the competitive game more appealing, the minoes arranged on the field 301 can be changed upon satisfying a certain condition. In the multiplayer mode of the present embodiment, the color of an arranged mino is changed as a result of a tetromino of a different color being newly arranged in a square adjacent to the already-arranged mino. That is to say, when a mino of a different color that is already arranged in the field 301 is adjacent, on a side, to one of the minoes that constitute a newly-arranged tetromino, the mino of the different color can be changed to a mino of the other color (the same color as the newly-arranged tetromino). Thus, it is possible to reduce minoes in the erasure-determined state of the opponent user, cause a minimum rectangle to be no longer formed and thus cause the minoes not to satisfy the erasure condition, or form a minimum rectangle of the user's color and expand the erasure-determined region. As a result, the competition for acquiring the score can be made to be more appealing.

Figure 9A:
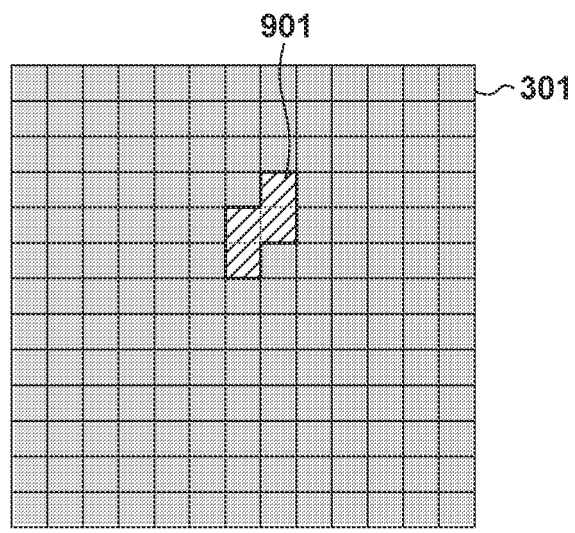
FIG. 9A is a diagram for illustrating a multiplayer mode of the puzzle game according to the embodiment of the present invention.
Figure 9B:
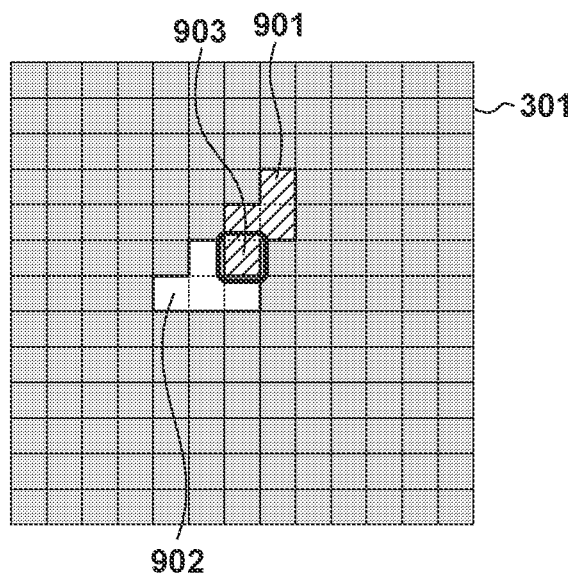
FIG. 9B is a diagram for illustrating the multiplayer mode of the puzzle game according to the embodiment of the present invention.
Figure 9C:
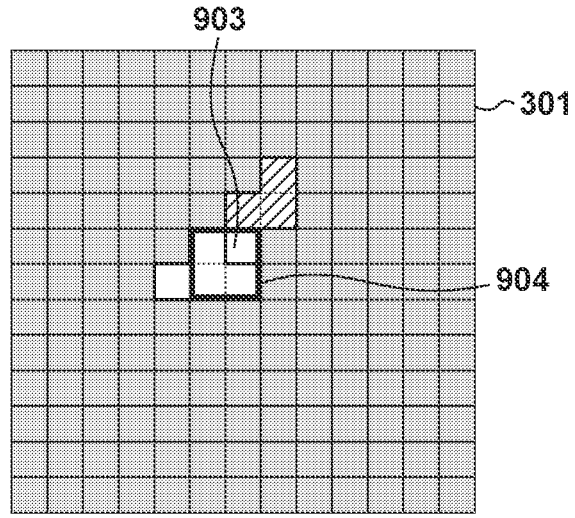
FIG. 9C is a diagram for illustrating the multiplayer mode of the puzzle game according to the embodiment of the present invention.

For example, when a tetromino 901 has already been arranged in the field 301 by a user A as shown in FIG. 9A, an opponent user B can newly arrange a tetromino 902 as shown in FIG. 9B, thereby changing the color of a mino 903 that is adjacent, on a side, to this tetromino and achieving the state in FIG. 9C. At this time, a minimum rectangle 904 is formed with minoes of the same color in the field 301, and thus, squares included in this minimum rectangle becomes an erasure-determined region of the user B. For favorable understanding, an icon for a countdown timer of the erasure-determined region is not shown in the example in FIG. 9C, but the countdown timer for counting until erasure is also set for this region.

Figure 9D:
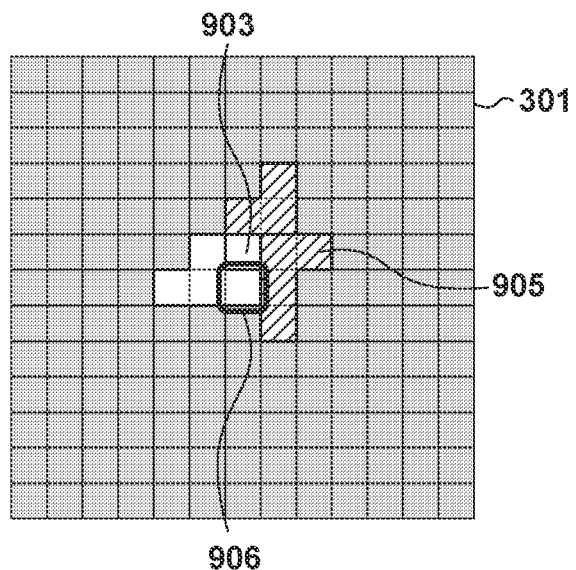
FIG. 9D is a diagram for illustrating the multiplayer mode of the puzzle game according to the embodiment of the present invention.
Figure 9E:
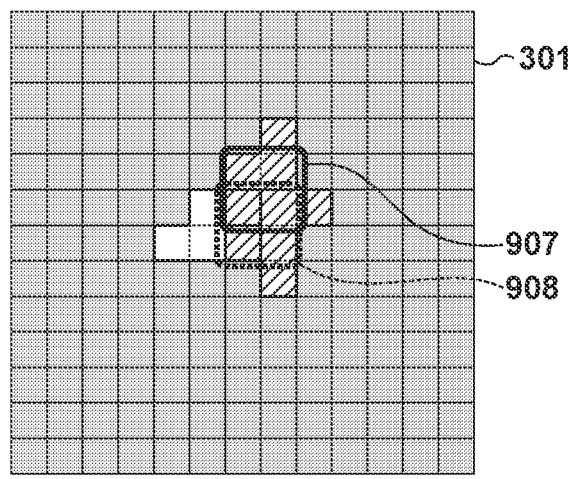
FIG. 9E is a diagram for illustrating the multiplayer mode of the puzzle game according to the embodiment of the present invention.

In the next turn, the user A can change the color of minoes 903 and 906 by newly arranging a tetromino 905 as shown in FIG. 9D. At this time, the minimum rectangle 904 shown in FIG. 9C is no longer constituted by minoes of the same color, and thus, the erasure condition is no longer satisfied, and the erasure-determined region and the countdown timer for the user B related to this minimum rectangle are canceled. On the other hand, as a result of the color of the minoes 903 and 906 being changed, minimum rectangles 907 and 908 are formed with minoes of the same color as shown in FIG. 9E, and thus, squares included in these rectangles become an erasure-determined region of the user A. Similarly, a countdown timer is set for this erasure-determined region.

Although it is described that, in the mode shown in FIGS. 9A to 9E, the erasure-determined region of the user B is canceled when the tetromino 905 is arranged, if a minimum rectangle is present in an erasure-determined region even after minoes whose color has been changed are excluded, the region of this minimum rectangle is maintained as an erasure-determined region, and the count of the countdown timer that has been set so far is continued.

Although the present embodiment describes that the multiplayer mode is a game mode that realize gameplay by a plurality of users, the implementation of the present invention is not limited thereto. That is to say, needless to say, the game provided in the multiplayer mode does not need to be interpersonal competition performed by users, and may alternatively be a game against a computer in which the opponent of the user arranges tetrominoes in accordance with a predetermined action program. In this case, the smartphone 100 provides gameplay in the multiplayer mode without communicating with a game server or another smartphone 100.

Game Processing

Figure 10A:
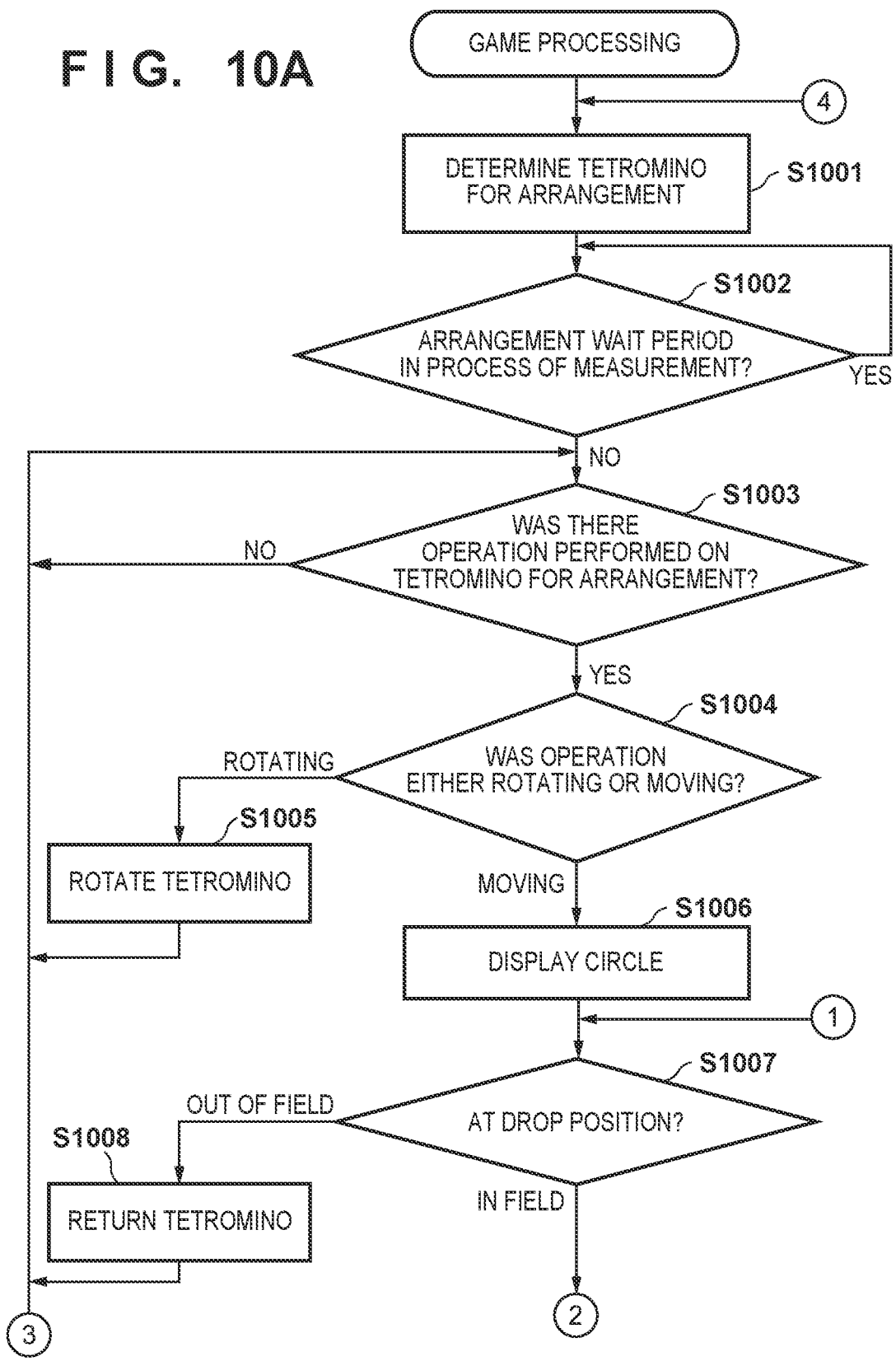
FIG. 10A is a flowchart illustrating an example of game processing for the puzzle game of the embodiment of the present invention.
Figure 10B:
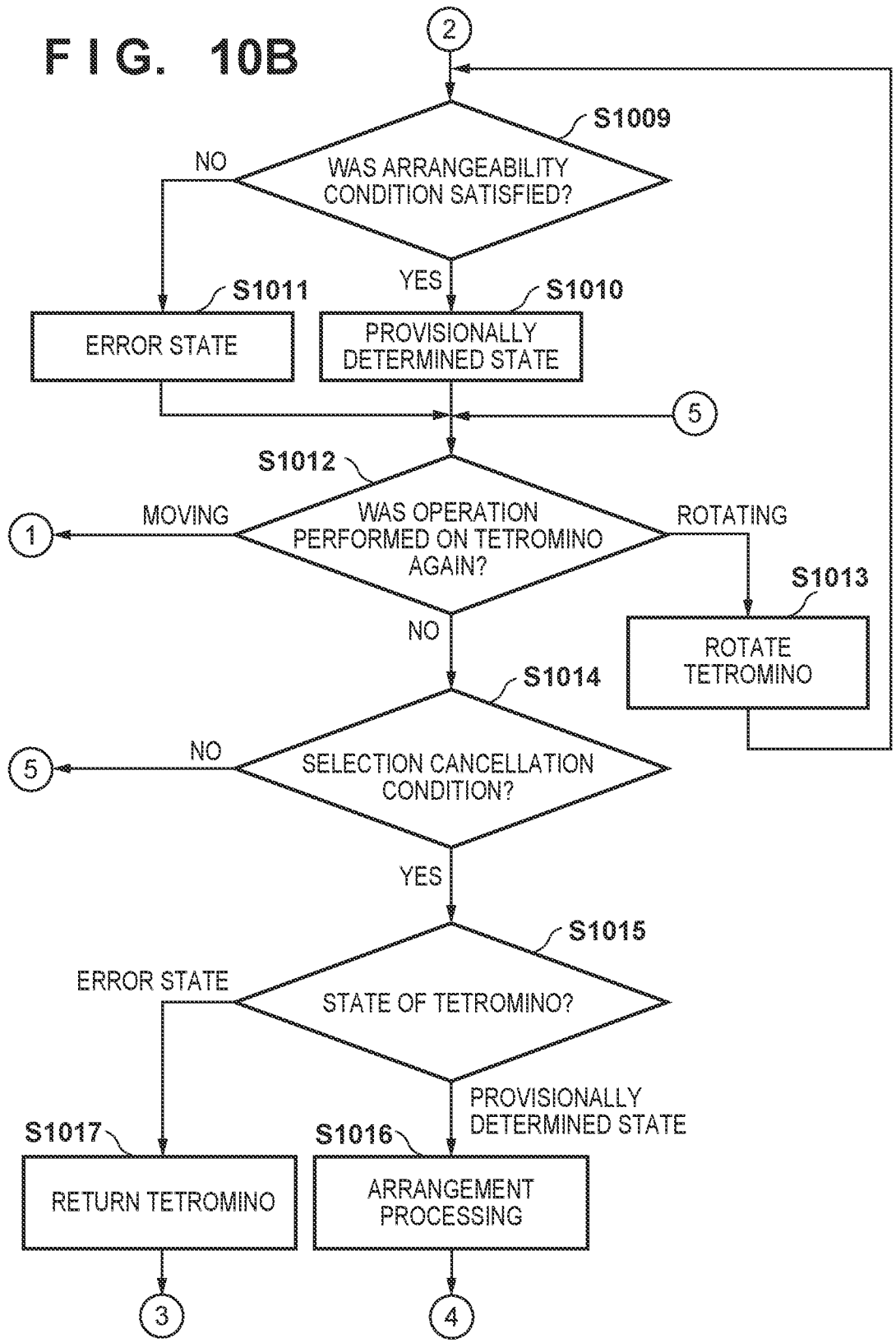
FIG. 10B is a flowchart illustrating an example of game processing for the puzzle game of the embodiment of the present invention.

Regarding game processing for providing gameplay in the puzzle game of the present embodiment that has the above-described configuration, specific processing will be described with reference to the flowcharts in FIGS. 10A and 10B. Processing corresponding these flowcharts can be realized by, for example, the control unit 101 reading out a corresponding processing program stored in the recording medium 102, loading the program to the memory 103, and executing the loaded program. Note that, to simplify the description, the present game processing is for realizing basic processing for providing the game in the single-player mode, and processing related to removal of obstacles, processing for erasing minoes based on a lapse of the erasure wait period that is executed in parallel, processing for ending the game due to the end condition of the game being satisfied, and so on, are omitted. In the present game processing, although display control processing related to the puzzle game is partially mentioned, the display control unit 104 generates a corresponding game screen using necessary information under the control of the control unit 101 in each frame of the game, and control for display on the display unit 110 is omitted. The description is given while assuming that the present game processing is started when a game start operation in the single-player mode is performed, for example.

In step S1001, the control unit 101 determines a tetromino 303 that is to be included in the arrangement mino area 302. There are seven types of tetrominoes each of which can be constituted by four minoes. However, since a tetromino constituted by two minoes×two minoes immediately forms a minimum rectangle in the puzzle game of the present embodiment, in this step, the control unit 101 may determine three tetrominoes that can be arranged by the user from six types of tetrominoes such as those shown in FIG. 2 through lottery processing or the like, for example. At this time, the three tetrominoes may include those of the same type. Note that if this step is reached after one tetromino 303 has been arranged from the arrangement mino area 302 into the field 301, the control unit 101 determines only one tetromino that is missing.

Although the present embodiment describes that there are six types of arrangeable tetrominoes shown in FIG. 2 for simplification, the implementation of the present invention is not limited thereto. For example, as mentioned above, a tetromino formed with two minoes×two minoes, which solely forms a minimum rectangle immediately after being arranged and satisfies the erasure condition, may be arrangeable. Furthermore, a mino group (three minoes×three minoes, four minoes×four minoes, five minoes×five minoes, two minoes×three minoes etc.) with a shape that immediately satisfies the erasure condition after being arranged may also be arrangeable. In addition, a single mino (one mino× one mino) may also be arrangeable such that the user can readily realize a desired mino arrangement in the field 301. Those special mino groups may be arrangeable only when a predetermined condition is satisfied during the progress of the puzzle game.

In step S1002, the control unit 101 determines whether or not a countdown timer related to the arrangement wait period of the tetromino is in the process of measurement. If it is determined that the countdown timer related to the arrangement wait period is in the process of measurement, the control unit 101 repeats this step until the arrangement wait period elapses, and if not, the control unit 101 does not wait but advances the processing to step S1003.

In step S1003, the control unit 101 determines whether or not an operation has been performed on a tetromino 303 to be arranged that is included in the arrangement mino area 302. If it is determined that an operation has been performed on a tetromino 303, the control unit 101 advances the processing to step S1004, and if not, the control unit 101 repeats the processing in this step.

In step S1004, the control unit 101 determines whether the operation performed on a tetromino 303 to be arranged is a rotating operation or a moving operation (drag operation). If it is determined that the operation performed on a tetromino 303 to be arranged is a rotating operation, the control unit 101 advances the processing to step S1005, and if it is determined that the operation performed on a tetromino 303 is a moving operation, the control unit 101 advances the processing to step S1006.

In step S1005, the display control unit 104 performs display control to rotate the corresponding tetromino 303 by 90 degrees in a predetermined direction within the arrangement mino area 302 in accordance with the performed rotating operation, under the control of the control unit 101, and the processing returns to step S1003.

On the other hand, if it is determined in step S1004 that a moving operation has been performed on a tetromino 303 to be arranged, in step S1006, the display control unit 104 performs display control to give a circle 401 to the target tetromino 303 in a selected state so as to identify this tetromino, under the control of the control unit 101.

Subsequently, provided that a drop operation has been performed on the tetromino 303 in the selected state, in step S1007, the control unit 101 determines whether or not the position at which the drop operation was performed is in or out of the field 301. For simplification, in the game processing of the present embodiment, it is described that when a drop operation to move a tetromino 303 into the field 301 is performed, all minoes that constitute this tetromino are included in the field 301. However, needless to say, the determination may be branched in more detail. If it is determined that the position at which the drop operation was performed on the tetromino 303 in the selected state is in the field 301, the control unit 101 advances the processing to step S1009. If it is determined that the position at which the drop operation was performed on the tetromino 303 in the selected state is out of the field 301, in step S1008, the control unit 101 restores the tetromino 303 in the selected to an unselected state, returns this tetromino 303 to the arrangement mino area 302, and returns the processing to step S1003.

In step S1009, the control unit 101 determines whether or not the tetromino 303 in the selected state satisfies the arrangeability condition. If it is determined that the tetromino 303 in the selected state satisfies the arrangeability condition, the control unit 101 advances the processing to step S1010, and if not, the control unit 101 advances the processing to step S1011.

In step S1010, the control unit 101 manages the tetromino 303 in the selected state as being in a provisionally determined state, and sets a timer for measurement of the determination grace period for this tetromino. At this time, if the tetromino 303 in the selected state is managed as being in an error state, the control unit 101 cancels the error state, and also cancels a setting of a timer for measurement of the impossibility notification period.

On the other hand, if it is determined in step S1009 that the arrangeability condition is not satisfied, in step S1011, the control unit 101 manages the tetromino 303 in the selected state as being in an error state, and sets a timer for measurement of the impossibility notification period for this tetromino. At this time, if the tetromino 303 in the selected state is managed as being in a provisionally determined state, the control unit 101 cancels the provisionally determined state, and also cancels a setting of a timer for measurement of the determination grace period.

In step S1012, the control unit 101 determines whether an operation to move the tetromino or an operation to rotate the tetromino has been performed within the circle 401 for the tetromino 303 in the selected state. If it is determined that an operation to move the tetromino in the selected state has been performed, the control unit 101 returns the processing to step S1007, and if it is determined that an operation to rotate the tetromino in the selected state has been performed, in step S1013, the control unit 101 causes the display control unit 104 to perform processing to rotate the tetromino by 90 degrees within the circle 401, and then returns the processing to step S1009. If it is determined that none of the operations has been performed on the tetromino in the selected state the control unit 101 advances the processing to step S1014.

In step S1014, the control unit 101 determines whether or not an operation to move the tetromino 303 in the selected state out of the circle 401 has been performed, or whether or not the timer set for the tetromino 303 in the selected state has reached the corresponding period. If it is determined that an operation to move the tetromino 303 in the selected state out of the circle 401 has ben performed, or that the set timer has reached the corresponding time, the control unit 101 advances the processing to step S1015, and if not, the control unit 101 returns the processing to step S1012.

In step S1015, the control unit 101 determines whether the tetromino 303 in the selected state is in a provisionally determined state or an error state. If it is determined that the tetromino 303 in the selected state is in a provisionally determined state, the control unit 101 advances the processing to step S1016, and if it is determined that the tetromino 303 in the selected state is in an error state, the control unit 101 advances the processing to step S1017.

In step S1016, the control unit 101 executes any of various kinds of processing depending on whether or not any erasure-determined region is present in the field 301.

Specifically, the control unit 101 manages the tetromino 303 in the selected state as being in a determined state, arranges the tetromino 303 in the current position in the field 301, and searches for a minimum rectangle that is be newly-formed. At this time, if it is determined that a new minimum rectangle is formed, and no other erasure-determined region is present, the control unit 101 manages the newly-formed minimum rectangle as an erasure-determined region, and sets a countdown timer related to the erasure wait period is set for this region. If any other erasure-determined region is present, and the newly-formed minimum rectangle expands this erasure-determined region, management is updated to manage a new erasure-determined region that includes this minimum rectangle, and the countdown timer that has been set for this region is reset. On the other hand, if the newly-formed minimum rectangle does not expand the erasure-determined region that is already present, the minoes in the erasure-determined region that is already present are processed to be forcibly erased from the field 301, the newly-formed minimum rectangle is managed as an erasure-determined region, and a countdown timer related to the erasure wait period is set for this region. At this time, the display control unit 104 performs processing to present a frame that surrounds the entire erasure-determined region based on the formed minimum rectangle and the icon 601 indicating the remaining time until this region is erased, under the control of the control unit 101. After thus performing processing, the control unit 101 returns the processing to step S1001.

If no new minimum rectangle is formed, the control unit 101 does not perform any particular processing, and returns the processing to step S1001.

On the other hand, if it is determined in step S1015 the tetromino 303 in the selected state is in an error state, in step S1017, the control unit 101 restores the tetromino to an unselected state, returns the tetromino to the arrangement mino area 302, and returns the processing to step S1003.

As described above, according to the application program (game program) for the puzzle game of the present embodiment, it is possible to enable disappearance of an object to be intuitively perceived, and make gameplay more appealing.

Although the present embodiment has described that a mino to be erased is specified (searched for) based on a criterion that is a minimum rectangle with a size of two minoes×two minoes, it will be readily understood that the size and the shape of a mino group serving as a search criterion is not limited thereto.

Other Embodiments

The present invention is not limited to the above embodiment, and various changes and modifications can be made without departing from the spirit and scope of the present invention. The game program according to the present invention can be provided and distributed by being recorded in a computer-readable recording medium, or through a telecommunication line.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A non-transitory computer-readable recording medium storing a game program for causing a computer, which realizes an electronic game that proceeds as a result of objects being arranged in a game field in which squares with a predetermined size are provided in a form of a lattice grid, to execute:

processing for arranging, in the game field, an arrangement object constituted by a plurality of unit elements having a size that corresponds to each of the squares being combined;

processing for determining whether or not a group of unit elements arranged adjacent to each other in the game field forms a predetermined shape;

processing for managing a region including the group of unit elements that forms the predetermined shape in the game field as an erasure-determined region;

processing for erasing, from the game field, the group of unit elements included in the erasure-determined region, of groups of unit elements arranged in the game field, if the erasure-determined region satisfies a predetermined condition, and leaving unit elements that are not included in the erasure-determined region, in squares in which these unit elements are arranged; and processing for performing control such that a new arrangement object can be arranged in squares from which the group of unit elements included in the erasure-determined region have been erased;

wherein the predetermined condition related to the erasure-determined region includes a condition of a period required to elapse until the group of unit elements included in the erasure-determined region are erased; and if, as a result of a new arrangement object being arranged, a group of unit elements is newly formed that has the predetermined shape and that is not adjacent to the erasure-determined region that is already present, the group of unit elements included in the erasure-determined region that is already present is erased independently of the period required to elapse.

2. The recording medium according to claim 1, wherein if, as a result of the new arrangement object being arranged, a group of unit elements is newly formed adjacent to or overlapping the erasure-determined region that is already present, the erasure-determined region is changed to a region including the newly formed group of unit elements and the period required to elapse regarding the erasure-determined region is extended.

3. The recording medium according to claim 1, wherein the game program further causes the computer to execute processing for identifiably presenting the erasure-determined region.

4. The recording medium according to claim 1, wherein the game program further causes the computer to execute processing presenting, in the game field, the period required to elapse regarding the erasure-determined region in association with the erasure-determined region.

5. The recording medium according to claim 1, wherein a lapse of a predetermined wait period is required for the new arrangement object to be able to be arranged next after the arrangement object is arranged in the game field, and the predetermined wait period is set to be shorter than the period required to elapse regarding the erasure-determined region.

6. The recording medium according to claim 1, wherein obstacles for which stepwise strengths are set are further arranged in the game field;

the obstacles include a first obstacle and a second obstacle having a lower strength than that of the first obstacle, the arrangement object being not able to be arranged in a region where the first obstacle is arranged, and the arrangement object being able to be arranged in a region where the second obstacle is arranged;

the first obstacle is controlled such that the strength of the first obstacle is reduced under a condition that a group of unit elements included in the erasure-determined region adjacent to the first obstacle is erased, and the second obstacle is controlled such that the strength of the second obstacle is reduced or the second obstacle is removed from the game field under a condition that a group of unit elements in a region where the second obstacle is arranged, the group of unit elements being included in the erasure-determined region, is erased.

7. A game control method for an information processing device for realizing an electronic game that proceeds as a result of objects being arranged in a game field in which squares with a predetermined size are provided in a form of a lattice grid, the method comprising:

an arrangement step of arranging, in the game field, an arrangement object constituted by a plurality of unit elements having a size that corresponds to each of the squares being combined;

a step of determining whether or not a group of unit elements arranged adjacent to each other in the game field in the arrangement step forms a predetermined shape;

a step of managing a region including the group of unit elements that forms the predetermined shape in the game field as an erasure-determined region;

a step of erasing, from the game field, the group of unit elements included in the erasure-determined region, of groups of unit elements arranged in the game field, if the erasure-determined region satisfies a predetermined condition, and leaving unit elements that are not included in the erasure-determined region, in squares in which these unit elements are arranged; and a step of performing control such that a new arrangement object can be arranged in squares from which the group of unit elements included in the erasure-determined region have been erased;

wherein the predetermined condition related to the erasure-determined region includes a condition of a period required to elapse until the group of unit elements included in the erasure-determined region are erased; and if, as a result of a new arrangement object being arranged, a group of unit elements is newly formed that has the predetermined shape and that is not adjacent to the erasure-determined region that is already present, the group of unit elements included in the erasure-determined region that is already present is erased independently of the period required to elapse.

\* \* \* \* \*